S. S. FERRIS.
Making Sheet Glass.

Patented Nov. 10, 1868.

Witnesses:

Inventor:
Samuel S. Ferris

S. S. FERRIS.
Making Sheet Glass.
No. 83,841.
2 Sheets—Sheet 2.
Patented Nov. 10, 1868.
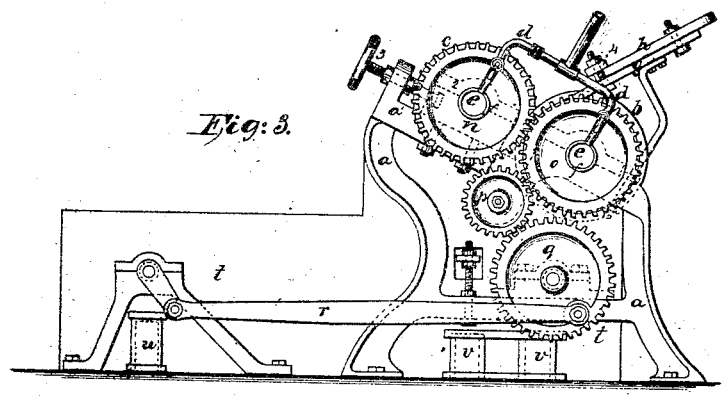
Fig: 3.
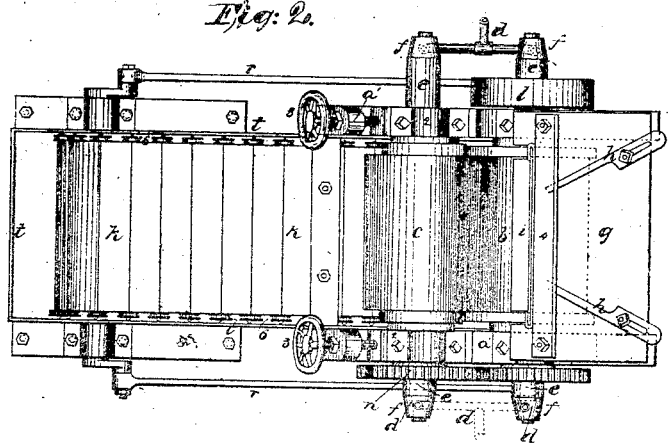
Fig: 2.
Witnesses:
Chas H Smith
D. Walker
Inventor:
Samuel S Ferris
per L. W. Serrell
att

SAMUEL S. FERRIS, OF NEW YORK, N. Y., ASSIGNOR TO HIMSELF AND WILLIAM O. ROBBINS, OF SAME PLACE.

Letters Patent No. 83,841, dated November 10, 1868.

IMPROVED MACHINE FOR MAKING SHEET-GLASS.

The Schedule referred to in these Letters Patent and making part of the same

*To all whom it may concern:*

Be it known that I, SAMUEL S. FERRIS, of the city and State of New York, have invented and made an Improvement in Machinery for Making Plate and Sheet-Glass; and I do hereby declare the following to be a full, clear, and exact description of the said invention, reference being had to the annexed drawing, making part of this specification, wherein—

Figure 2 is a plan of the same.

Figure 3 is an elevation of the side of the machine.

Similar marks of reference denote the same parts.

Figure 1:
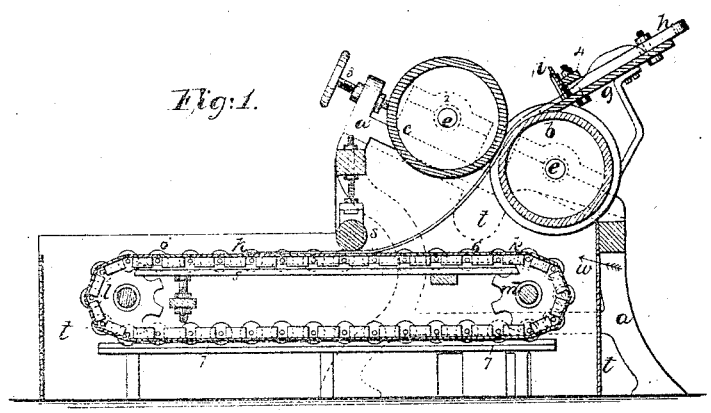
Figure 1 is a vertical longitudinal section of said machine.

The object of this invention is to roll out sheets or plates of glass between a pair of rollers, and receive the same upon a flat platform, and straighten the glass previous to its cooling, and to regulate the temperature of the various parts of the machine.

The nature of the said invention consists in a device for regulating the flow of the glass to a pair of rollers that roll out a sheet of uniform thickness; and, in combination therewith, I make use of a platform for receiving the glass, a roller for flattening the same, and an enclosure for regulating the temperature of the apron, by the introduction of hot or cold air, and the speed of cooling of the glass.

In the drawing, $a$ $a$ are frames sustaining the working parts of the machine; $b$ and $c$ are the rollers for rolling out the sheet of glass.

These rollers are to be made hollow, and also the journals supporting them, in order that a current of hot air, superheated steam, steam, or water, may be caused to flow through the rollers, for regulating their temperature, either to heat them previous to beginning the manufacture, or to cool them during the manufacture of the plate or sheet-glass.

The pipe $d$ $d$, connecting to the respective journals $e$ $e$, by means of sleeves $f$ that allow the rotation of the journal, and, at the same time, a free opening, may be employed for the inlet and outlet of the materials employed for regulating the temperature of the rollers $b$ and $c$.

The journal-boxes, 2, of the roller $c$, are made adjustable by means of the screws 3 3, so as to vary the thickness of glass rolled out between the rollers $b$ and $c$, and the portions $a'$ of the frame $a$ may be removable and adjustable, so as to allow of the introduction of shorter rollers by the parts $a'$ being brought nearer together.

Above the roller $b$ is an inclined table, $g$, upon which are the movable side pieces $h$, that can be adjusted to regulate the width of opening between which the melted glass, that is poured upon the table $g$, passes to the rollers $b$ $c$, and 4 is a clamping-bar to hold the ends of the side pieces $h$ in p' .e.

$i$ is a gate, that is adjustable vertically, to regulate, generally, the thickness of the l yer of melted glass passing to the rollers $b$ $c$.

Beneath the rollers $b$ $c$, a movable platform, $k$, is provided. This is made of metal plates properly formed, and provided with slides on their under sides to run upon the slide-ways 5, and the platform is rendered as smooth and level as practicable, and the different plates or sections, forming said platform, are to be hinged together to form an endless chain, passing over the pulleys $l$ $m$, at any desired distance apart.

By means of the gearing $n$ $o$ $p$ $q$, the rollers $b$ and $c$ are driven, and the shaft of the pulley $m$ turned, and by means of crank-pins on the respective ends of the shafts of the rollers $m$ $l$, placed at ninety degrees apart, and the pairs on the respective sides connected by links, $r$ $r$, the pulley $l$ will be revolved without the strain of so doing coming upon the platform-chain.

Rollers 6 6, at the edges of the platform, may be provided, running upon the ways 7, to support the platform-chain at the under side as it is drawn towards the pulley $m$.

The surface of the platform $k$ is to move at the same velocity as the glass is received from between the rollers $b$ and $c$, and an adjustable or yielding roller, $s$, is employed to press the glass upon the platform, and straighten out any bend or warp therein.

The platform itself may be of any length required for containing the plate of glass made from one charge of glass, or the manufacture may be continuous, the plate being cut up at the delivery-end of the platform.

In order to regulate the temperature of the platform and the speed of cooling of the glass, I enclose said platform by the casing $t$, and provide openings at $u$ and $v$, fitted with slides to admit any desired amount of air to cool off the said platform, more or less, as required; or, if necessary, heated air may be admitted near the receiving-end.

An opening is shown in the casing at $w$, fig. 1, that allows air to pass in and cool the sheet of glass as it descends from the rollers $b$ $c$.

This mode of manufacturing plate or sheet-glass allows for the ornamenting of said glass, by the engraving of any desired character of designs upon the roller $c$ or $b$, to produce either relief or countersunk designs in the glass, and, if desired, the glass might be marked by this means, so as to facilitate the separation of the same into sheets of given sizes.

What I claim, and desire to secure by Letters Patent, is—

1. A pair of rollers, formed hollow, and provided with means, substantially as specified, for regulating their temperature, in combination with the inclined table $g$ and movable side pieces $h$, for regulating the width of the melted glass passing to said rollers, substantially as set forth.

2. The platform $k$, formed of a series of plates hinged together, in combination with the rollers $b$ and $c$, and straightening-roller $s$, for the purposes and substantially as set forth.

In witness whereof, I have hereunto set my signature, this 30th day of September, A. D. 1868.

SAMUEL S. FERRIS.

Witnesses:
CHAS. H. SMITH,
GEO. T. PINCKNEY.